United States Patent [19]

Matson, Jr.

[11] 4,213,200
[45] Jul. 15, 1980

[54] POSITION DETERMINING DEVICES

[75] Inventor: Leslie E. Matson, Jr., Weston, Mass.

[73] Assignee: The Charles Stark Draper Laboratory, Inc., Cambridge, Mass.

[21] Appl. No.: 18,522

[22] Filed: Mar. 8, 1979

Related U.S. Application Data

[63] Continuation of Ser. No. 851,886, Nov. 16, 1977, abandoned.

[51] Int. Cl.$^2$ .............................................. G01S 1/72
[52] U.S. Cl. .................................... 367/117; 367/125; 367/901
[58] Field of Search ............................ 340/16 R, 16 P

[56] References Cited

U.S. PATENT DOCUMENTS

| | | | |
|---|---|---|---|
| 3,186,226 | 6/1965 | Milnes et al. | 73/339 A |
| 4,035,762 | 7/1977 | Chamuel | 340/16 R |

*Primary Examiner*—Richard A. Farley
*Attorney, Agent, or Firm*—Robert F. O'Connell

[57] ABSTRACT

An improved position determining device using a delay line with energy absorptive terminations at the ends thereof and having a driver transducer coupled to the delay line for producing a traveling wave on the line and a first receiver transducer coupled to the delay line at the distance to be determined. A second receiver transducer, also coupled to the delay line, is displaced from the first receiver transducer by a distance preferably substantially equal to one-quarter wavelength of the traveling wave signal. Each of the receiver transducers detects the direct traveling wave signal from the driver transducer and a traveling wave signal component which is reflected from an end termination. The detected signals from the second receiver transducer are phase-shifted by a 90° phase lag and the phase-shifted signals are combined with the signals detected by the first receiver transducer, whereby the reflected signal components in the combined output signal are effectively eliminated.

6 Claims, 2 Drawing Figures

4,213,200

POSITION DETERMINING DEVICES

This is a continuation of application Ser. No. 851,886 filed Nov. 16, 1977, now abandoned.

INTRODUCTION

This invention relates generally to continuous wave single axis position determining systems and, more particularly, to improved systems for making linear and angular position determinations with a high degree of linearity.

BACKGROUND OF THE INVENTION

An effective approach to single and multi-axis linear and angular position determining systems has been shown in U.S. Pat. No. 4,035,762, issued on July 12, 1977 to Jacques R. Chamuel. Such patent describes various embodiments for measuring a position along a line, either straight or curved, or on a plane, a sphere, or other curvilinear surface, with a high degree of accuracy at a reasonable cost. In many of the embodiments described therein a delay line element, preferably fabricated of a magnetostrictive material, has a driver transducer which is utilized to produce a traveling wave which travels along the magnetostrictive delay line, the presence of which wave is subsequently detected by a receiver transducer. The receiver transducer, for example, may be movable with respect to the delay line and to the driver transducer which is fixedly positioned for coupling to the delay line. By appropriate phase shift measurements utilizing continuous wave signals or by suitable time delay measurements utilizing pulse signals, as described therein, linear or angular positions can be accurately determined with a high degree of resolution.

As discussed in the above-referenced Chamuel patent, when using a delay line element, the ends of the delay line are terminated in appropriate energy absorbing materials so as to prevent signal reflections thereat. The presence of such reflections tends to affect the linearity of the phase modulation of the C-W signals in the positioning determining measurement and, if the energy at the ends of the line can be sufficiently absorbed so as to reduce reflections to negligible levels, the linearity in most applications is satisfactory.

In some applications, however, the presence of even relatively small reflections may be sufficient to reduce the linearity of the measurements to a point where the device becomes much less effective than is required for the particular use to which it is being put. It is desirable, therefore, to improve such linearity by preventing the effects of reflections from introducing a nonlinear response in the operation of the device.

A BRIEF SUMMARY OF THE INVENTION

In accordance with the invention, the effect of reflections at the terminating ends of a delay line element can be substantially completely eliminated by providing a second receiver transducer which is displaced from the main receiver transducer by approximately one-quarter wave length ($\lambda/4$) of the signal which travels along the delay line. Both receiver transducers detect the principal signal as it travels along the delay line from the driver transducer, as well as the reflected signal from the end termination point. If the output of the second receiver transducer is phase shifted by approximately 90° and added to the output of the main receiver transducer and the sum thereof is appropriately supplied to the phase detectors utilized in making the position determination, the effects of the reflected wave can be substantially completely eliminated.

DESCRIPTION OF THE INVENTION

The invention can be described in more detail with the assistance of the accompanying drawings wherein.

Figure 1:
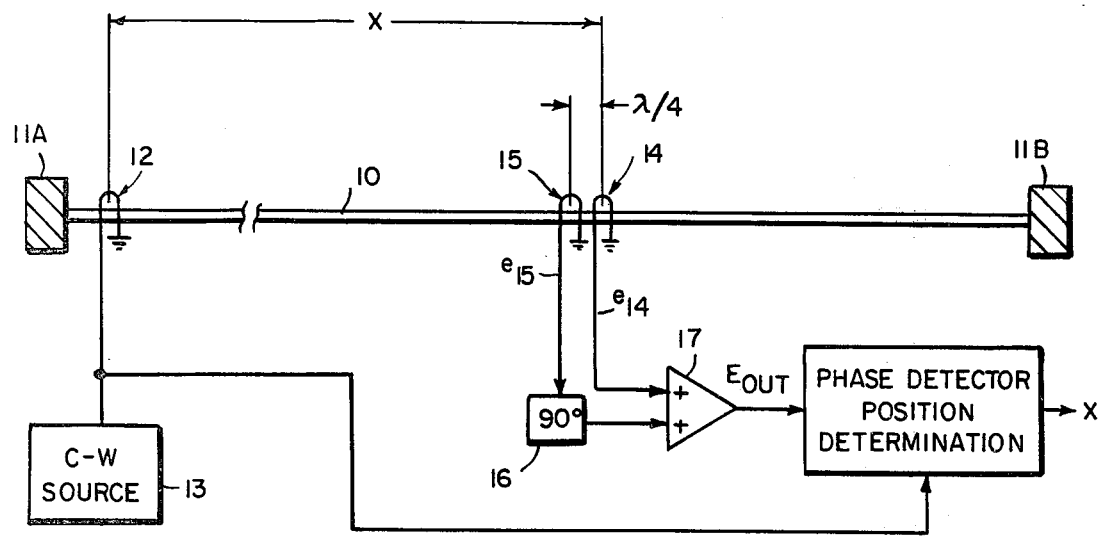
FIG. 1 shows an exemplary embodiment of the invention for a determination of position along a linear distance.

FIG. 1 shows an exemplary embodiment of the invention wherein a magnetostrictive delay line 10 has energy absorptive termination elements 11A and 11B at each end thereof, in substantially the same manner as discussed above in the previously issued Chamuel patent. A driver transducer 12 is excited by an appropriate signal from a signal source 13, which in the embodiment shown is a continuous wave (C-W) signal source. The driver transducer and delay line in such embodiment may be fixedly positioned, for example. A receiver transducer 14, coupled to the delay line 10, is movable with reference to the delay line and to driver transducer 12 and it is desired to determine the distance between such transducers, as discussed in the Chamuel patent.

In accordance with a preferred embodiment of the invention, a second receiver transducer 15 is positioned along delay line element 10 at a location which is displaced from main receiver transducer 14 by approximately a quarter wave length of the C-W signal from source 13, identified in FIG. 1 as $\lambda/4$, where $\lambda$ is the wavelength of such signal. The detected signal from main receiver transducer 14 is supplied to one input of a summation amplifier 17. The signal detected at second receiver transducer 15 is supplied to an approximately 90° phase shift network 16, the output of which is supplied to the other input of summation amplifier 17. The amplified summation the signals from both receiver transducers 14 and 15 is supplied as the output signal, identified as $E_{out}$, to the phase detector measuring system (not shown in detail but described in the above-referenced Chamuel patent, as described above).

Each of the receiver transducers 14 and 15 detects the presence of the principal traveling wave signal from driver transducer 12 as it passes by such receiver transducers. Each of the latter transducers also detects the presence of any reflected waves which are reflected at termination 11B, which reflected waves travel in the opposite direction from the principal signal along delay line element 10. It is helpful in understanding the operation of the invention to consider the signals involved and the relationship therebetween as they are summed at summation amplifier 17.

The output signal from receiver transducer 14 comprises a first portion $e_p$ which represents the principal detected signal directly received from driver transducer 12 expressed as follows:

$$e_p = Re[e^{j(\omega t - kx)}], \qquad (1)$$

where Re stands for the "real part of", $\omega = 2\pi f$, f is the frequency of the signal from C-W source 13, $k = 2\pi/\lambda$, $\lambda$ is the wavelength of the signal which is propagated along delay line element 10, and x is the distance from driver transducer 12 to receiver transducer 14.

A second portion $e_r$, which represents the detected signal received by transducer 14 as a result of reflection from termination 11B, is expressed as follows:

$$e_r = Re[re^{j(\omega t + kx)}] \qquad (2)$$

where r is the amplitude of the reflected wave. For convenience, the amplitude of the main wave from driver transducer 12 is normalized to unity in equation (1) above.

The total signal $e_{14}$ at transducer 14 can then be expressed as $$e_{14} = e_p + e_r = Re[e^{j\omega t}(e^{-jkx} + re^{jkx})] \qquad (3)$$

In a similar manner, the output of the second auxiliary receiver transducer 15 can be expressed in substantially the same manner where x is replaced by $$(x - g\frac{\lambda}{4})$$

where g is a factor preferably at or near unity. Accordingly, the output $e_{15}$ can be expressed as $$e_{15} = Re[e^{j\omega t}(e^{-jk(x-g\frac{\lambda}{4})} e^{jk(x-g\frac{\lambda}{4})})] \qquad (4)$$

The output $e_{15}$ is supplied to a phase shift network which produces an electrical phase lag of (180°-g 90°) where g is the same factor introduced above in connection with the mechanical spacing of transducers 14 and 15, and has a value of preferably at or near unity for best operation.

The overall output from summation amplifier 17 (assuming unity gain) is identified as $E_{out}$ and is given by $$E_{out} = Re[e^{j\omega t}e^{-jkx}(1 + e^{j\pi(g-1)})] \qquad (6)$$

As can be seen, if the amplitudes and the phases are as shown, $E_{out}$ does not contain any component of the reflected wave $e_r$ (which would contain the factor r) and such reflected component is effectively cancelled at the output of the summation amplifier 17. Although theoretically, the quantity g can be set to any value other than an even integer, in a practical sense g should preferably be a value about, or at least relatively close to unity. If the quantity g is unity, the magnitude of $E_{out}$ is maximized, resulting in better performance than for other values.

Figure 2:
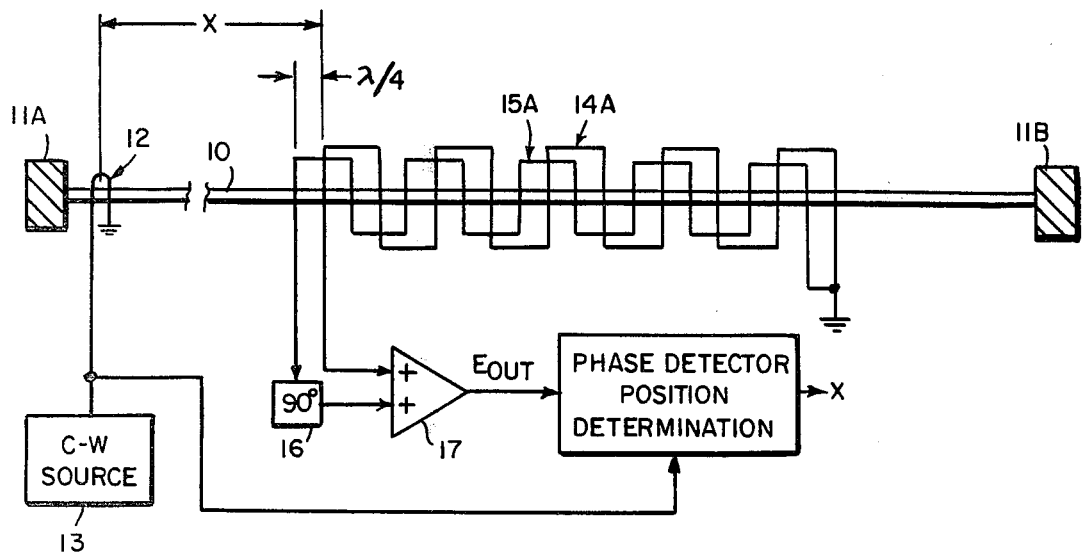
FIG. 2 shows an alternative embodiment of the device of FIG. 1.

An alternative embodiment illustrating the operation of the invention when utilizing printed pattern receiver transducers is shown in FIG. 2, the printed pattern being of the square wave pattern type discussed with regard to various embodiments in the above referenced Chamuel patent. In a manner similar to that discussed with reference to FIG. 1, summation of the signals obtained at the principal receiver printed pattern transducer 14A and the 90°-phase shifted signal from the auxiliary square wave pattern transducer 15A provides an output signal $E_{out}$ in which any reflected waves from termination 11B are also effectively cancelled. The use of the printed pattern embodiment of FIG. 2 may be less practical in many applications than that of FIG. 1 because of the greater difficulty in fabricating the patterns to provide the desired ($\lambda/4$) spacing therebetween and the matching of the signal amplitudes which is required.

Although the invention is described with reference to the two embodiments shown in FIGS. 1 and 2, it is clear that the same principle can be utilized in all of the single axis embodiments shown in the previously issued Chamuel patent wherein a delay line element having energy absorptive terminations is used. Accordingly, a source of nonlinearity which may assume significance in many applications is considerably reduced by the use of the invention so that the linearity is effectively improved. Alternatively, by utilizing the invention it may be possible in many applications to provide for the substantially same nonlinearity levels as obtained without using the invention while at the same time permitting a relaxation of the requirements on the precision components or on the adjustments which are associated with the terminations of the delay line element.

What is claimed is:

1. A position determining apparatus comprising
at least one delay line element;
at least one driver transducer means coupled to said delay element at a first position;
means for activating said driver transducer means to produce a continuous-wave signal which travels in said delay element and has a phase which varies linearly with the distance traveled along said delay element;
first receiver transducer means having a periodic configuration and coupled to said delay element at a second position to be determined relative to said driver transducer means, said first receiver transducer means detecting said continuous-wave signal at said first receiver transducer means and detecting a reflected continuous-wave signal at said first receiver transducer means, which reflected signal travels in said delay element and has a phase which varies linearly with distance traveled along said delay element, the detected continuous-wave output signal from said first receiver transducer means having a phase which varies non-linearly with distance along the delay element;
second receiver transducer means having a periodic configuration substantially the same as said first receiver transducer and coupled to said delay element at a third position which is displaced from said second position by a distance equal to g times $\lambda/4$ where $\lambda$ is the wave length of the continuous-wave signal produced by said activated driver transducer means and g has a value which is between zero and about unity, said second receiver transducer means detecting said continuous-wave signal at said second receiver transducer means, the detected continuous-wave output signal from said second receiver transducer means having a phase which varies non-linearly with distance along the delay element;
means responsive to the detected continuous-wave output signal from said second receiver transducer means for phase-shifting said detected signal by g times 90° to produce a phase-shifted, detected signal;
means for summing the detected continuous-wave output signal from said first receiver transducer means and the phase-shifted, detected output signal from said second receiver transducer means to produce a combined detected output signal, the phase of which varies linearly with distance along the delay element; and
means responsive to the phase of said combined detected output signal and to the phase of said activated continuous-wave signal at said driver transducer means for determining the position of said first receiver transducer means relative to said driver transducer means.

2. A position determining apparatus in accordance with claim 1 wherein said phase shifting means shifts the phase of said detected signals in such a manner as to produce a phase-shift lag thereof.

3. A position determining apparatus in accordance with claim 2 wherein g is substantially equal to unity.

4. A position determining apparatus in accordance with claim 3 wherein said first and second receiver transducer means are in the form of periodic printed pattern configurations.

5. A position determining apparatus in accordance with claim 4 wherein said periodic printed pattern configurations are periodic square wave patterns.

6. A position determining apparatus in accordance with claim 5 wherein each of said periodic square wave patterns has a period equal to the period of said activated traveling continuous wave signal.

* * * * *